United States Patent
Tarizzo (10) Patent No.: US 11,181,146 B2
(45) Date of Patent: Nov. 23, 2021

(54) COORDINATE-MEASURING MACHINE WITH SELF-CLEANING AIR BEARING

(71) Applicant: HEXAGON TECHNOLOGY CENTER GMBH, Heerbrugg (CH)

(72) Inventor: Alberto Tarizzo, Balgach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 65 days.

(21) Appl. No.: 16/838,724

(22) Filed: Apr. 2, 2020

(65) Prior Publication Data

US 2020/0318683 A1   Oct. 8, 2020

(30) Foreign Application Priority Data

Apr. 3, 2019  (EP) .................................. 19167052

(51) Int. Cl.
  *G01B 5/008*  (2006.01)
  *F16C 32/06*  (2006.01)
  *G01B 5/00*   (2006.01)

(52) U.S. Cl.
  CPC .......... *F16C 32/0614* (2013.01); *G01B 5/008* (2013.01); *G01B 5/0009* (2013.01); *F16C 2370/00* (2013.01)

(58) Field of Classification Search
  CPC ................................................... G01B 5/0009
  USPC ......................................................... 33/503
  See application file for complete search history.

(56) References Cited

U.S. PATENT DOCUMENTS

| 5,125,163 A * | 6/1992 | Bury .................... G01B 5/0014 33/573 |
| 5,660,480 A | 8/1997 | Fujii et al. |
| 6,443,618 B1 | 9/2002 | Nishikawa et al. |
| 6,829,838 B1 * | 12/2004 | Weekers ............... G01B 5/0014 33/503 |
| 7,191,541 B1 * | 3/2007 | Weekers ............ B23Q 11/0003 33/503 |

(Continued)

FOREIGN PATENT DOCUMENTS

| CN | 2608939 Y | 3/2004 |
| CN | 101437628 A | 5/2009 |

(Continued)

OTHER PUBLICATIONS

Eurpean Search Report dated Oct. 21, 2019 as received in Application No. 19167052.0.

(Continued)

*Primary Examiner* — George B Bennett
(74) *Attorney, Agent, or Firm* — Maschoff Brennan (57) ABSTRACT

The motion system for a CMM includes a measuring axis with an air bearing, a control unit for determining a position of the measuring probe in a reference frame and outputting the position as a measuring result. The first air bearing includes a guideway, slide having a slide surface and a gas outlet within the slide surface. The gas outlet is for providing a gas cushion in a gap between the slide surface and the guideway. A cover is arranged around the slide so a gap is provided between the cover and the guideway and a hollow space is provided between the cover and the slide. A wiper is arranged on the cover. A nozzle unit is supplied by a second gas supply line and for providing a high-pressure gas flow directed onto the guideway.

18 Claims, 5 Drawing Sheets

(56) References Cited

U.S. PATENT DOCUMENTS

| | | | |
|---|---|---|---|
| 8,510,967 B2* | 8/2013 | Tarizzo | G01B 5/0004 33/503 |
| 8,739,420 B2* | 6/2014 | Tarizzo | G01B 1/00 33/503 |
| 9,441,935 B2* | 9/2016 | Kawakami | G01B 5/008 |
| 10,646,883 B2* | 5/2020 | Hunter | G01B 5/0004 |
| 2002/0126922 A1 | 9/2002 | Cheng et al. | |
| 2005/0040338 A1 | 2/2005 | Weiss et al. | |
| 2007/0137058 A1 | 6/2007 | Liu et al. | |
| 2015/0176956 A1 | 6/2015 | Pettersson et al. | |
| 2017/0284462 A1 | 10/2017 | Ueda et al. | |
| 2018/0304276 A1 | 10/2018 | Hunter | |
| 2018/0309354 A1 | 10/2018 | Angood et al. | |
| 2020/0080830 A1* | 3/2020 | Hunter | G01B 5/0016 |

FOREIGN PATENT DOCUMENTS

| | | |
|---|---|---|
| CN | 101441337 A | 5/2009 |
| CN | 104583618 A | 4/2015 |
| CN | 104729439 A | 6/2015 |
| CN | 107269698 A | 10/2017 |
| CN | 208075791 U | 11/2018 |
| CN | 109405786 A | 3/2019 |
| DE | 10105309 A1 | 8/2002 |

OTHER PUBLICATIONS

Junan Zhang "Study on High Stiffness Aerostatic Bearing", Dec. 1, 2006.

* cited by examiner

COORDINATE-MEASURING MACHINE WITH SELF-CLEANING AIR BEARING

CROSS-REFERENCE TO RELATED APPLICATIONS

This application claims priority to European Patent Application No. 19167052.0 filed on Apr. 3, 2019, which is incorporated herein by reference.

FIELD OF THE INVENTION

The present invention relates to a coordinate-measuring machine.

BACKGROUND OF THE INVENTION

Coordinate-measuring machines (CMMs) are used to measure geometric features of measuring objects by sensing discrete points on its surface with a mechanical or optical probe. There are CMMs configured for allowing a user to manually control the probe position, and there are CMMs having a computer controlled probe. The probe position relative to the measuring object can be measured in a three-dimensional reference system, for example in Cartesian or polar coordinates. There are also CMMs allowing the probe to pivot in order to reach surfaces that would otherwise be unreachable.

Coordinate-measuring machines are usually set up in measuring rooms where the air is specifically controlled with respect to temperature, flow, and cleanliness. CMMs are high-precision devices and the quality of measurement data achievable with CMMs is highly sensitive to such environmental conditions.

A particularly delicate element of an CMM is its motion system which provides the positioning of the probe relative to a table where the measuring object is placed. Commonly, CMMs have air bearings allowing for a translational friction free travel, wherein the corresponding guideways (guide rails, or even the table surface itself) are sometimes exposed to environmental influences.

Since nowadays, CMMs are more and more integrated into production environments (shop floor), the above mentioned issue becomes even more crucial. Dust and other particles inevitably settle all over the CMM and also within the motion system. Particular problems are friction, gripping or failure of the bearing caused by particles or accumulation of particles that slip into the clearance between the pad and the guide.

SUMMARY OF THE INVENTION

In some embodiments, the invention provides an improved coordinate-measuring machine. In particular, a CMM according to the invention allows for a safer, more accurate and more robust measuring operation. Specifically, a CMM according to the invention allows for a measuring operation in environments not satisfying measuring room standards.

In some embodiments, the invention relates to a Coordinate-measuring machine (CMM) comprising a table with a surface for receiving an object to be measured, a measuring probe, a motion system configured for altering a relative position between the table and the measuring probe, the motion system comprising a measuring axis with an air bearing, a control unit configured for determining a position of the measuring probe in a reference frame, and outputting the position as a measuring result, wherein the first air bearing comprises a guideway, slide comprising a slide surface and a gas outlet within the slide surface, the gas outlet configured for being supplied by a first gas supply line and for providing a gas cushion in a gap between the slide surface and the guideway, a cover arranged around the slide in such a way that a gap is provided between the cover and the guideway and a hollow space is provided between the cover and the slide, a wiper arranged on the cover and narrowing or closing the gap between the cover and the guideway, a nozzle unit configured for being supplied by a second gas supply line and for providing a high-pressure gas flow directed onto the guideway.

In some embodiments, the first and second supply lines may be fed by a common gas source.

In some embodiments, the first supply line may be fed by a first gas source and the second supply line may be fed by a second gas source, wherein the first gas source provides a gas with a higher quality compared to a gas provided by the second gas source.

In some embodiments, the motion system may be configured for altering the position of the table relative to the measuring probe, or for altering the position of the measuring probe relative to the table.

In some embodiments, the nozzle unit may comprise at least one nozzle and wherein the high-pressure air flow is an air blade or an air jet. An air blade may be understood as a flow having a thin layer shaped profile. An air jet may be understood as a flow having a spot shaped profile.

In some embodiments, the nozzle unit may be arranged on the slide, wherein the high-pressure gas flow is directed onto the guideway and adjacent to the slide surface.

In some embodiments, the gap between the nozzle unit and the guideway may be wider than the gap between the slide surface and the guideway.

In some embodiments, the nozzle unit may be arranged in the hollow space between the cover and the slide, wherein the high-pressure gas flow is directed onto the guideway between the wiper and the slide surface.

In some embodiments, the nozzle unit may be arranged on an exterior of the cover, wherein the high-pressure gas flow is directed onto the guideway adjacent to the wiper, or onto the wiper, or partially onto the guideway adjacent to the wiper and partially onto the wiper.

In some embodiments, the nozzle unit may be arranged on the wiper, wherein the high-pressure gas flow is directed onto the guideway adjacent to the wiper, or onto the wiper, or partially onto the guideway adjacent to the wiper and partially onto the wiper.

In some embodiments, the control unit may be configured for controlling the gas supply from the second gas supply line to the nozzle unit.

In some embodiments, the gas supply from the second gas supply line to the nozzle unit may be configurable to be constant over time.

In some embodiments, the gas supply from the second gas supply line to the nozzle unit may be configurable to be only activated on demand.

In some embodiments, the gas supply from the second gas supply line to the nozzle unit may be configurable to be automatically activated for a period, wherein time and duration of the period are definable via the control unit.

In some embodiments, the gas supply from the second gas supply line to the nozzle unit may be configurable to be automatically activated in intervals, wherein time and duration of the intervals are definable via the control unit.

BRIEF DESCRIPTION OF THE DRAWINGS

By way of example only, preferred embodiments of the invention will be described more fully hereinafter with reference to the accompanying figures, wherein.

DETAILED DESCRIPTION

Figure 1:
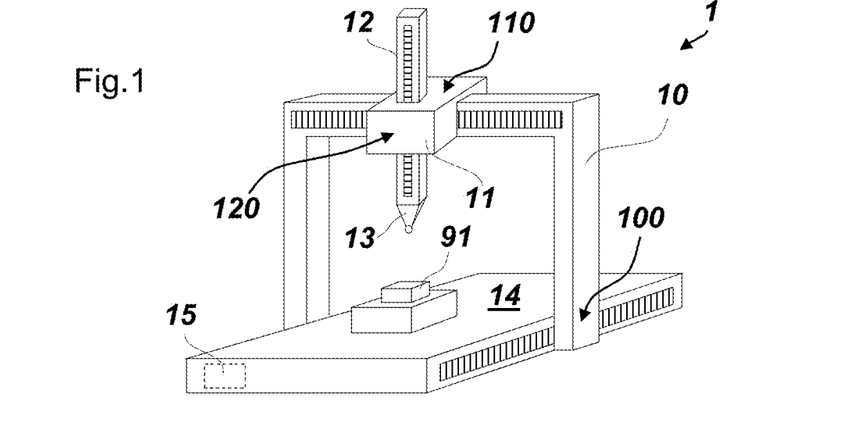
FIG. 1 shows an exemplary CMM of a bridge type with a probe motorised relative to a measuring table.

FIG. 1 shows an embodiment 1 of a coordinate-measuring machine (CMM) according to the present invention being of a bridge type, wherein the bridge 10 is movable along a first measuring axis by a first linear motor 100, the cross slide 11 is movable along a second measuring axis by a second linear motor 110, and the probe holder 12 is movable along a third measuring axis by a third linear motor 120. By this motion system, the probe 13 can be moved relative to the table 14, i.e. relative to an object 91 to be measured and received by the table 14.

Each measuring axis is provided with an according bearing, wherein at least one of these bearings is an air bearing. Embodiments of an air bearing according to the invention will be presented with the FIGS. 4-12. The CMM 1 also has a control unit 15 for determining the current position of the measuring probe 13 in a reference frame of the CMM and for outputting it as a measuring result. The position of the measuring probe 13 could be determined based on readings of the motors 100, 110, 120, or based on readings of additional position detectors placed in the respective measuring axes.

At least one of the measuring axes shown in FIG. 1 could also be embodied by a movable table instead of by the superstructure as shown. As an example, the probe holder 12 could be rigid with respect to the cross slide 11 and instead, the table 14 could be configured to be lifted and lowered accordingly.

The CMM shown in FIG. 1 is just an example; it is not necessary for carrying out the invention to have exactly three measuring axes. A CMM according to the invention can have two or only one measuring axis.

Figure 2:
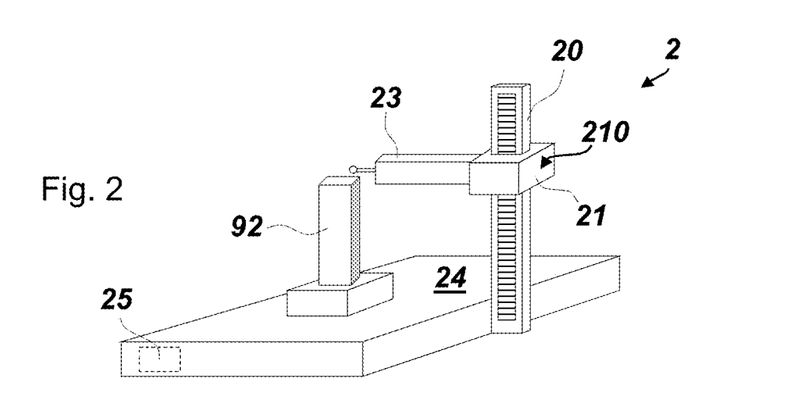
FIG. 2 shows an exemplary CMM with one measuring axis for height measurements.

A CMM 2 with only one measuring axis is shown in FIG. 2. This measuring axis is formed by the stand 20 on which a lift slide 21 is mounted. The lift slide 21 can be lifted and lowered by a motor 210. A measuring probe 23 can be used to determine a height of a measuring object 92 which is placed on the table 24. A control unit 25 is configured for computing a height value of the measuring object 92 and in particular for controlling the motion system which comprises an air bearing. The air bearing is accordingly arranged within the lift slide 21.

Figure 3:
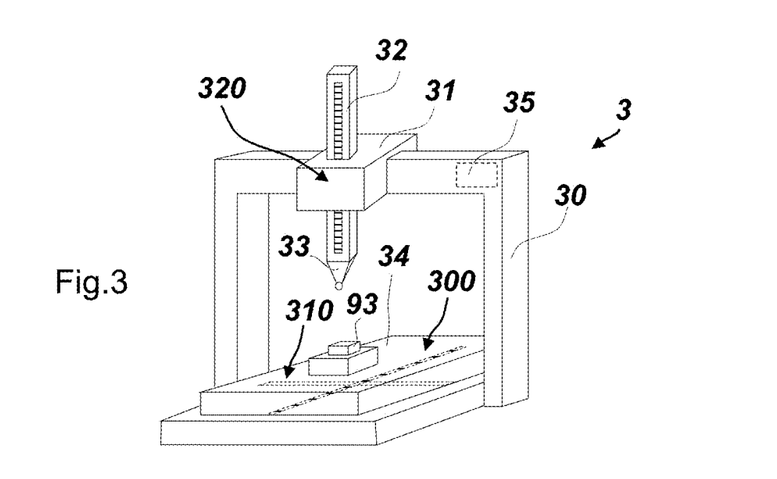
FIG. 3 shows a further exemplary CMM of a bridge type with a probe fixed relative to the environment and with a table motorised relative to a probe.

A further CMM embodiment 3 is shown in FIG. 3. This CMM 3 has a fixed bridge 30 and the probe holder 32 is mounted not in a cross slide but in a fixed housing 31 with a fixed arrangement relative to the bridge 30. The probe holder 32, however, is movable along a vertical measuring axis by an according linear motor 320 and a corresponding bearing, in particular an air bearing. The two measuring axes perpendicular to the vertical measuring axis are achieved with the table 34 which is configured to be moved horizontally along two perpendicular horizontal measuring axes by means of according linear motors 300 and 310, and by means of corresponding bearings underneath the table 34. Again, at least one of the three mentioned bearings for the measuring axes is an air bearing. Embodiments of such an air bearing according to the invention will be presented with the FIGS. 4-12. The CMM embodiment 3 has a control unit 35 by which coordinates of an object 93 to be measured can be determined and output.

The motors 100, 110, 120, 210, 300, 310, 320 mentioned in the embodiments of FIGS. 1, 2, and 3 are optional. An entirely manual maneuverability of the motion system, i.e. of at least one measuring axis, is one alternative. Another alternative is a hybrid system where e.g. an electric motor is providing a motion resistance and only removing this "lock" when a manual attempt to move a respective axis is exceeding a threshold force.

The invention also relates to other CMMs, e.g. CMMs having rotating measuring axes, such as a SCARA (selective compliance assembly robot arm) structured CMM. For the sake of conciseness, such CMMs are not shown in the figures, but are nonetheless comprised by the present invention. A rotary axis of a CMM may also be equipped with an air bearing according to the invention. Such a rotary air bearing will be presented with FIG. 12.

Figure 4:
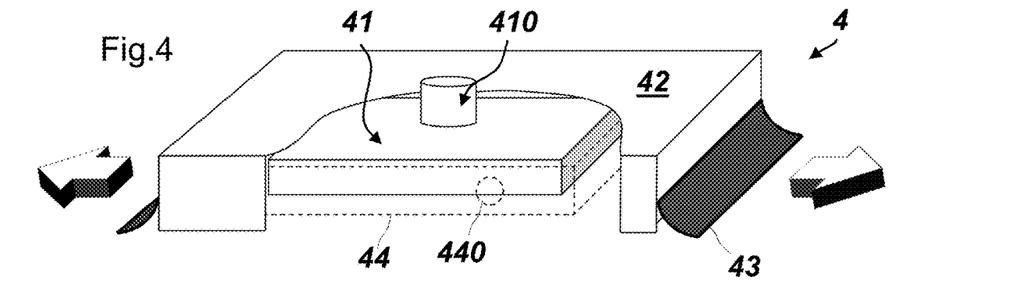
FIG. 4 shows a first embodiment of an air bearing according to the invention.
Figure 5:
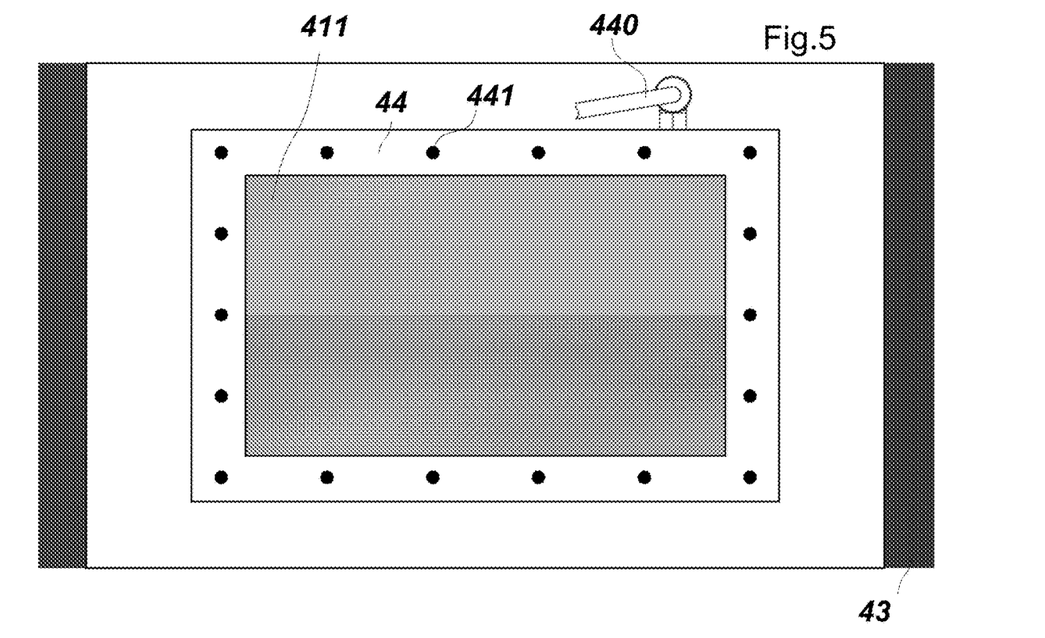
FIG. 5 shows the bottom of the first embodiment of the air bearing as shown in FIG. 4.
Figure 6:
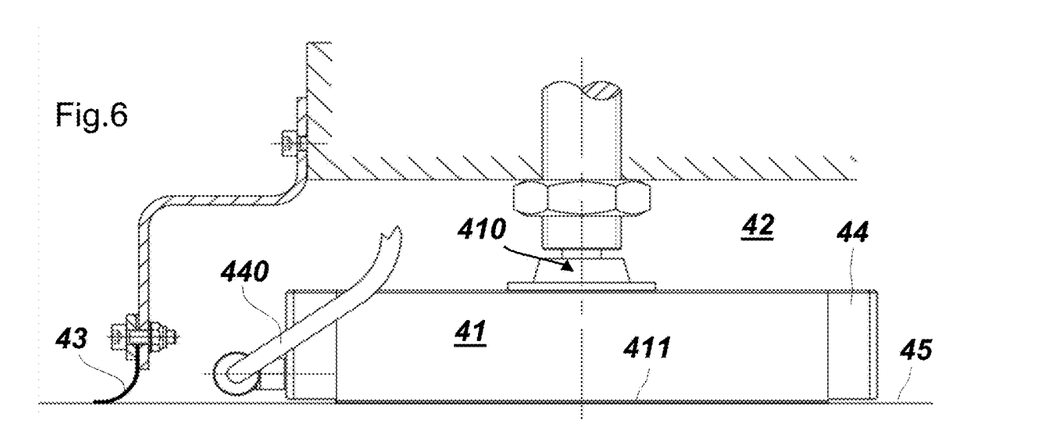
FIG. 6 shows a lateral section view of the first embodiment of the air bearing as shown in FIGS. 4 and 5.

FIGS. 4, 5, and 6 show a first possible embodiment 4 of an air bearing. The air bearing comprises a slide 41 which is encased by a cover 42. Via a conduct 410 (which may be integrated in the ball stud mounting transmitting the load onto the slide), a gas outlet within a slide surface 411 on the bottom of the slide 41 is supplied by a first gas supply line. The gas outlet is configured in such a way that it provides a gas cushion in a gap between the slide surface 411 and a guideway 45 (shown in FIG. 6). The gas cushion is generated by interplay of a gas supply out of the gas outlet and a counterforce, e.g. the weight of the corresponding part of the CMM bearing down on the slide, or a counterforce generated by another slide oppositely arranged. Due to the provided gas cushion, the slide is configured to travel along the corresponding measuring axis with almost no friction.

The gas outlet is abstractly indicated in the figures by the latticed structure. There are various kind of gas outlets known in the art, such as porous carbon or a structured channel/chamber configuration. However, it is not significant to the invention how exactly the gas outlet is designed. Further, for the sake of comprehensibility, the embodiments herein have flat guideways and flat slide surfaces. However, as well, the invention comprises further embodiments of air bearings known in the art, such as e.g. entangled guideway/slide surface structures where opposing gas cushions are stabilising the axis.

The cover 42 is designed and arranged such that there is a gap between the rim of the cover and the guideway 45. This gap is at least as high as the gap defined by the gas cushion between the slide surface 411 and the guideway 45. Arranged on the cover 42 is a wiper 43 which is here exemplarily embodied as a wiper blade made from a flexible material. The wiper blade can, however, be embodied in various different ways, including various materials (cloth, silicon, rubber, etc., or a combination thereof) and shapes (brushes, blades, lamellae, etc., or a combination thereof). As is shown here, there may be provided two wiper blades according to a forth and back movement (indicated with the arrows in FIGS. 4 and 7).

In this way, the gap is closed or almost closed in the front and back (referring to the directions of travel). The wiper can touch or almost touch the guideway with its lip. In one embodiment, the wiper is arranged such that it is pressed against the guideway with a defined preload. Perpendicular to the travel directions, the gap between the cover 42 and the guideway 45 may be still open or closed or almost closed by an element other than the wiper. However, the wiper 43 may also be designed to close this lateral gap by being mounted on the cover 42 in a surrounding manner. The wiper as mentioned herein may also be understood as a composition of two or more separate wiper elements (which is the case in the examples of FIGS. 5 and 8).

The air bearing 4 further comprises a nozzle unit 44, which is embodied in the example according to FIGS. 4, 5, and 6 as being mounted adjacent to the slide 41. The gap between the nozzle unit 44 and the guideway 45 may be higher than the gas cushion which is particularly apparent in FIG. 5. The nozzle unit 44 comprises in this example a plurality of nozzles which are all supplied with gas by a second gas supply line via the conduct 440. Generally, the nozzle unit is configured to provide a high-pressure gas flow directed onto the guideway to protect the gas cushion of the bearing from any particles. Generally, the second gas supply line may provide gas of lesser quality compared to the gas provided by the first gas supply line. However, this is not a necessity and the first and second gas supply lines may as well merge at some point such that both supply lines are fed from one singular gas source. Generally, the gas may be air or any sort of technical gas or gas mix.

The gas flow provided by the nozzle unit 44 has a cleansing effect on the guideway 45, such that the gas pad (gas cushion) under the gas outlet 411 is free of any disturbing particles. The nozzle unit 44 is not contributing to the bearing functionality. The single nozzle openings 441 in the nozzle unit 44 (FIG. 5 shows them as black holes) can be designed in many different ways, e.g. such that they provide an air "blade" (thin layer of air) for example by providing a slit as nozzle, or a gas flow spot(s) as would result from the depicted hole nozzles, or a specific diffuse air stream created by a special shape of the nozzle(s). In the example shown in FIG. 5, the nozzle unit 44 encompasses the slide 41 or slide surface 411. However, in other embodiments, the nozzle unit 44 is only mounted at the front sides with regard to the travel directions, i.e. just as it is the case with the elements of the wiper 43.

The nozzle unit providing the high-pressure air flow generates a "protection zone" around the critical area of the air bearing and therewith allows keeping away particles from the bearing pad that has not been wiped away by the wiper lip. Advantageously, the air flow provided by the nozzle unit cooperates with the wiper in that excess pressure is generated in the hollow space between the cover 42 and the slide 41. Having excess pressure in the hollow space allows small particles to be blown away before even touching the wiper 43 (where particles remaining despite of the high-pressure air flow are yet wiped away by the wiper lip).

The air flow provided by the nozzle unit may also cooperate with the wiper in that the wiper is pressed against the guideway by the air flow (this is—at least optionally—applicable with an embodiment according to FIGS. 7, 8, 9, and 12 where the nozzle is arranged on the outer side of the cover and the air flow may be directed at least partly onto the wiper). Pressing the lip against the guideway makes sure that no particle (in particular no small particle) is missed out by the wiper lip.

The air bearings shown in the FIGS. 4-9, have a rectangular profile. However, they may as well be embodied as having a round, in particular circular, profile.

Figure 7:
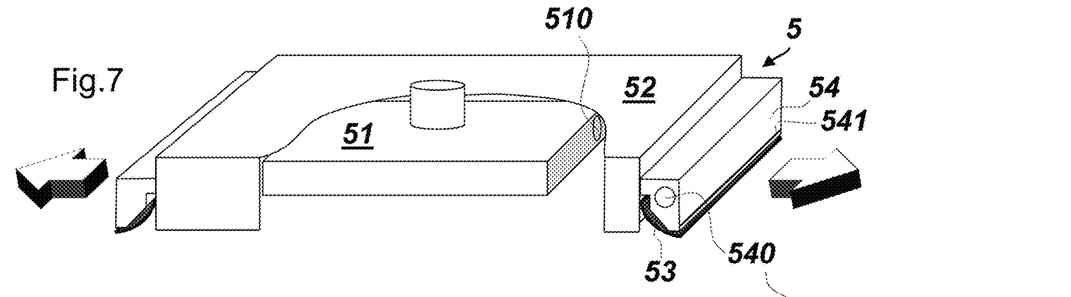
FIG. 7 shows a second embodiment of an air bearing according to the invention.
Figure 8:
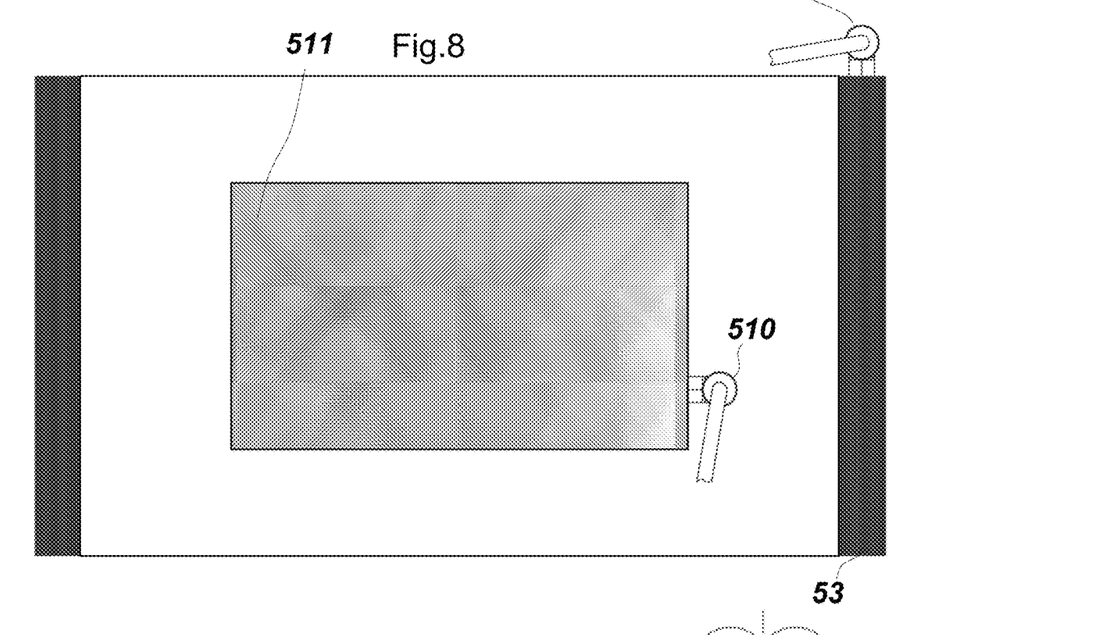
FIG. 8 shows the bottom of the second embodiment of the air bearing as shown in FIG. 7.
Figure 9:
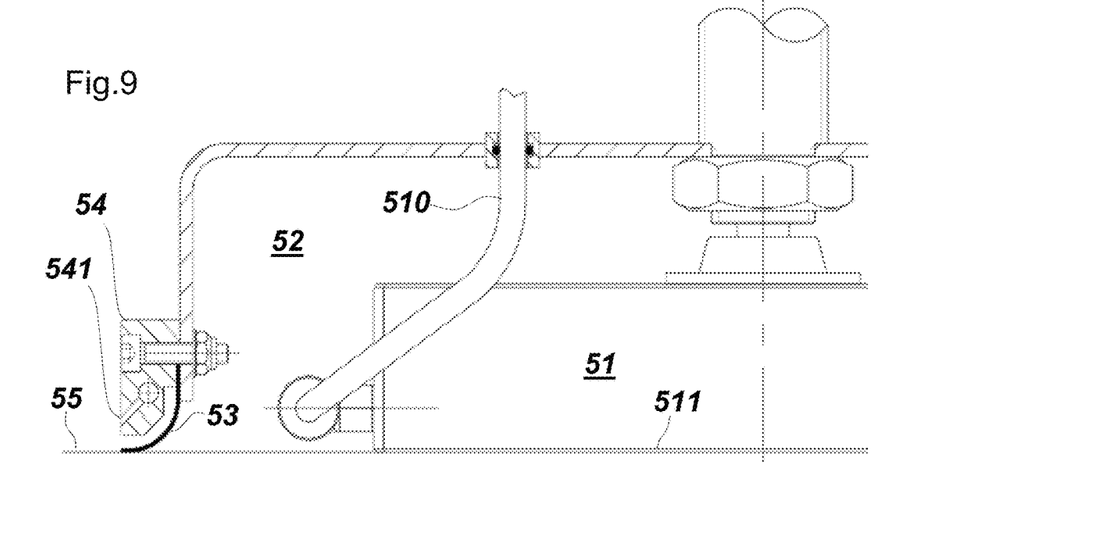
FIG. 9 shows a lateral section view of the second embodiment of the air bearing as shown in FIGS. 7 and 8.

FIGS. 7, 8, and 9 show another embodiment 5 of an air bearing of a CMM according to the invention. Therein, the nozzle unit 54 is an external element mounted on the cover 52 and directing the high-pressure air flow by its opening 541 onto the guideway 55 adjacent to the wiper 53. The nozzle unit 54 is supplied via a conduct 540 with gas from a second gas supply line. A conduct 510 for supplying the gas outlet 511 with gas from a first gas supply line may be provided on the side of the slide 51. The nozzle unit 54 is configured for providing a cleansing air flow next to the wiper, which is particularly advantageous when the air flow blows away particles which would otherwise have been met by the wiper due to the movement of the CMM.

Figure 10:
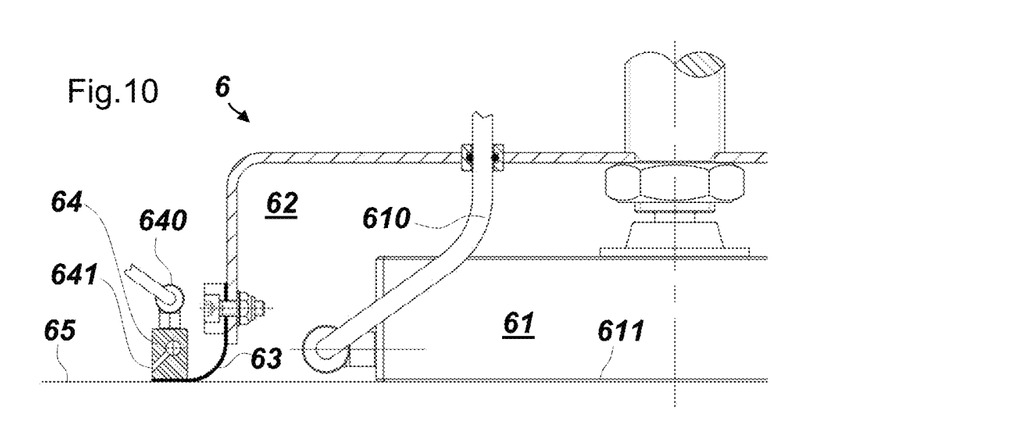
FIG. 10 shows a lateral section view of a third embodiment of an air bearing according to the invention.

A further air bearing embodiment 6 is shown in FIG. 10. Again, for providing a gas cushion, the slide surface 611 on the slide 61 has a gas outlet which is fed by a gas conduct 610 which is supplied by the first gas supply line. The cover 62 is equipped with the wiper 63. On the wiper 63, the nozzle unit 64 is arranged, which is supplied with gas from the second gas supply line via the conduct 640. The weight of the nozzle unit 64 bears on the wiper, therewith pressing it against the guideway 65. A high-pressure gas flow, e.g. an air blade, provided by the opening 641 on the nozzle unit 64 removes particles adjacent to the wiper. Not only is the guideway generally cleaned more thoroughly, but also is the durability of the wiper increased.

Figure 11:
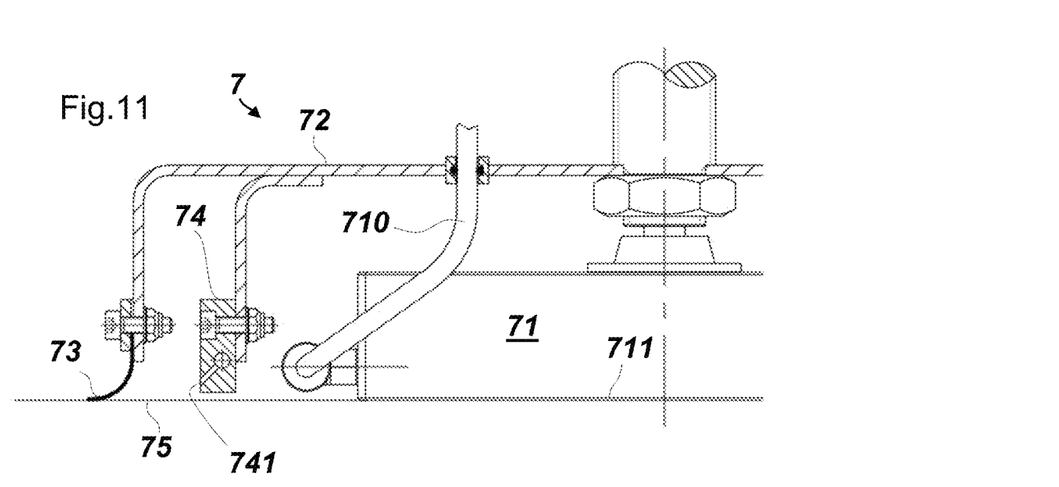
FIG. 11 shows a lateral section view of a fourth embodiment of an air bearing according to the invention.

In a further embodiment shown in FIG. 11, the nozzle unit 74 of the air bearing 7 may also be arranged in the hollow space between the cover 72 and the slide 71. In this case the air blade provided by the nozzle unit 74 is directed between the wiper 73 and the slide surface 711. The nozzle unit 74 is shown here in the middle, but it could also be arranged closer to the wiper 73 or to the slide 71, in particular directly adjacent to the wiper or the slide. Again, the gas outlet generating the gas cushion between the slide surface 711 and the guideway 75 is fed by conduct 710 with gas from a first gas supply line. The supply for the nozzle unit 74 is not visible in this view of FIG. 11 and therefore not shown. The nozzle 741 providing the high-pressure air flow makes sure that all remaining particles, which the wiper 73 let through, is blown away before even coming close to the air cushion under the slide.

Figure 12:
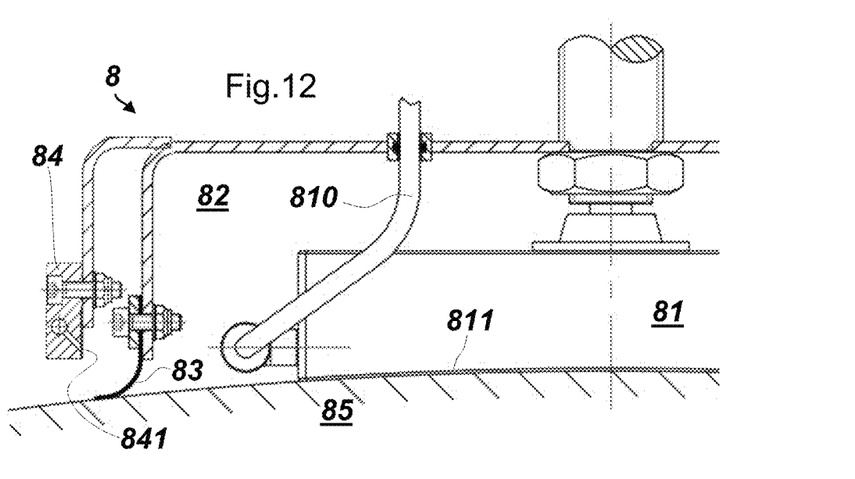
FIG. 12 shows a lateral section view of a fifth embodiment of an air bearing according to the invention.

Yet another embodiment of an air bearing for a CMM is shown in FIG. 12. This air bearing 8 is particularly usable for a rotatory measuring axis, which are e.g. needed in a SCARA structured CMM. The guideway 85 is curved in this embodiment. The nozzle unit 84 is an external element mounted on a sheet arranged on the cover 82 and directing the high-pressure air flow by its opening 841 onto the wiper 83. By adjusting the alignment of the nozzle unit 84, the air flow could also be directed partly onto the guideway 85 and partly onto wiper 83. The nozzle unit 84 is supplied via a conduct not shown in this sectional view. A conduct 810 for supplying the gas outlet 811 with gas from a first gas supply line is provided on the side of the slide 81. The nozzle unit 84 is configured for cleansing the guideway 85 adjacent to the wiper 83 and/or for pressing down the wiper 83 against the guideway 85.

Figure 13:
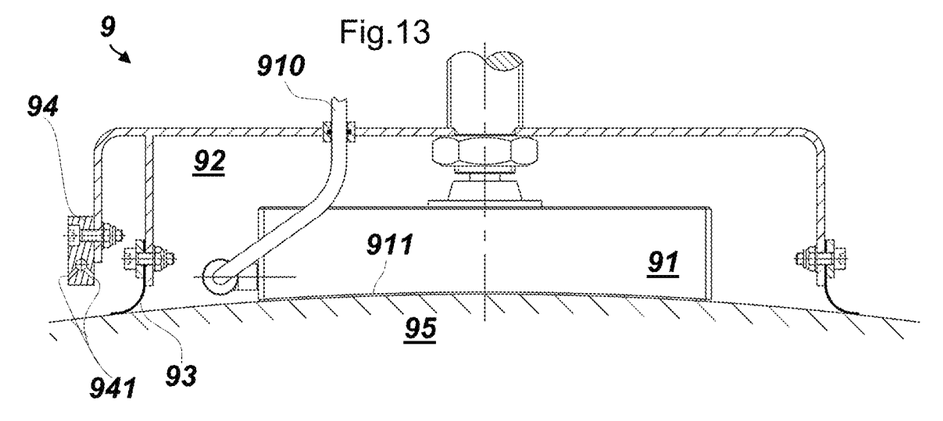
FIG. 13 shows a lateral section view of a sixth embodiment of an air bearing according to the invention.

A further embodiment is shown in FIG. 13, where a slide 91 travels on a gas cushion between a slide surface 911 and a guideway 95, the gas cushion provided by a gas outlet within a slide surface 911, the gas outlet fed by a supply line 910. A cover 92 encases the slide 91 and attached to the cover 92 is a nozzle unit 94, which provides two air blades with the nozzles 941. One of the air blades is directed onto the wiper 93 and the other air blade is directed onto the guideway 95 adjacent to the wiper 93. This configuration combines the above mentioned effects. A nozzle unit 94 as shown in FIG. 13 can also be provided for an air bearing running on a straight (non-curved) guideway.

Generally, each of the control units 15, 25, and 35 of the CMMs shown in FIGS. 1-3 could also be externally arranged, e.g. in a computer plugged to or wirelessly connected to the CMM, or in a remote server. Specifically, the control units can be configured to control the gas flow through the nozzle unit 44/54/64/74/84. In other words, the inflow from the second gas supply line is then controllable by the control unit.

In particular, the high-pressure air or gas flow from the nozzle unit could be activated—manually or automatically, in particular based on sensors—on demand or permanently. In a further embodiment, the nozzle unit could be activated automatically in a predefined interval or interval pattern with predefined periods of high-pressure air flow. In particular, the activation of the air flow through the nozzle unit could follow a pattern optimised for dust removal.

The first gas supply line and the second gas supply line may in a particular embodiment also be one and the same gas supply line.

The figures show flat bearings, i.e. flat slides and flat guideways. However, the elements could also—with respect to a profile perpendicular to the direction of travel—be embodied circularly or entanglingly. Further, the wipers shown in the examples are straight pieces, however, they can also be embodied entangling the whole cover, leaving no side gaps whatsoever.

The invention is not restricted to (fixed/moving) bridge type CMMs but is also applicable to e.g. gantry type CMMs, horizontal arm CMMs, floor type CMMs, portal type CMMs, shaft measuring CMMs, cantilever CMMs, SCARA CMMs, and gear measuring CMMs.

Although the invention is illustrated above, partly with reference to some preferred embodiments, it must be understood that numerous modifications and combinations of different features of the embodiments can be made. All of these modifications lie within the scope of the appended claims.

What is claimed is:
1. A Coordinate-measuring machine (CMM) comprising:
  a table with a surface for receiving an object to be measured,
  a measuring probe,
  a motion system configured for altering a relative position between the table and the measuring probe, the motion system comprising a measuring axis with an air bearing, and
  a control unit configured for determining a position of the measuring probe in a reference frame, and outputting the position as a measuring result,
  wherein the first air bearing comprises:
    a guideway,
    a slide comprising a slide surface and a gas outlet within the slide surface, the gas outlet configured for being supplied by a first gas supply line and for providing a gas cushion in a gap between the slide surface and the guideway,
    a cover arranged around the slide in such a way that a gap is provided between the cover and the guideway and a hollow space is provided between the cover and the slide,
    a wiper arranged on the cover and narrowing or closing the gap between the cover and the guideway, and
    a nozzle unit configured for being supplied by a second gas supply line and for providing a high-pressure gas flow directed onto the guideway.

2. The CMM according to claim 1, wherein the first and second supply lines are fed by a common gas source.

3. The CMM according to claim 1, wherein the first supply line is fed by a first gas source and the second supply line is fed by a second gas source, wherein the first gas source provides a gas with a higher quality compared to a gas provided by the second gas source.

4. The CMM according to claim 1, wherein the motion system is configured for altering the position of the table relative to the measuring probe, or for altering the position of the measuring probe relative to the table.

5. The CMM according to claim 1, wherein the nozzle unit comprises at least one nozzle and wherein the high-pressure air flow is an air blade or an air jet.

6. The CMM according to claim 1, wherein the nozzle unit is arranged on the slide, and wherein the high-pressure gas flow is directed onto the guideway and adjacent to the slide surface.

7. The CMM according to claim 6, wherein a gap between the nozzle unit and the guideway is wider than the gap between the slide surface and the guideway.

8. The CMM according to claim 1, wherein the nozzle unit is arranged in the hollow space between the cover and the slide, and wherein the high-pressure gas flow is directed onto the guideway between the wiper and the slide surface.

9. The CMM according to claim 1, wherein the nozzle unit is arranged on an exterior of the cover, and wherein the high-pressure gas flow is directed onto the guideway adjacent to the wiper, or onto the wiper, or partially onto the guideway adjacent to the wiper and partially onto the wiper.

10. The CMM according to claim 1, wherein the nozzle unit is arranged on the wiper, and wherein the high-pressure gas flow is directed onto the guideway adjacent to the wiper, or onto the wiper, or partially onto the guideway adjacent to the wiper and partially onto the wiper.

11. The CMM according to claim 1, wherein the control unit is configured for controlling the gas supply from the second gas supply line to the nozzle unit.

12. The CMM according to claim 10, wherein the gas supply from the second gas supply line to the nozzle unit is configurable to be constant over time.

13. The CMM according to claim 10, wherein the gas supply from the second gas supply line to the nozzle unit is configurable to be only activated on demand.

14. The CMM according to claim 10, wherein the gas supply from the second gas supply line to the nozzle unit is configurable to be automatically activated for a period, wherein time and duration of the period are definable via the control unit.

15. The CMM according to claim 10, wherein the gas supply from the second gas supply line to the nozzle unit is configurable to be automatically activated in intervals, wherein time and duration of the intervals are definable via the control unit.

16. The CMM according to claim 11, wherein the gas supply from the second gas supply line to the nozzle unit is configurable to be only activated on demand.

17. The CMM according to claim 12, wherein the gas supply from the second gas supply line to the nozzle unit is configurable to be automatically activated for a period, wherein time and duration of the period are definable via the control unit.

18. The CMM according to claim 13, wherein the gas supply from the second gas supply line to the nozzle unit is configurable to be automatically activated in intervals, wherein time and duration of the intervals are definable via the control unit.

\* \* \* \* \*